United States Patent
Jiang et al.

(10) Patent No.: US 11,962,158 B2
(45) Date of Patent: Apr. 16, 2024

(54) REGULATION METHOD AND REGULATION DEVICE FOR CONVERTER OF WIND TURBINE GENERATOR IN WIND POWER PLANT

(71) Applicant: XINJIANG GOLDWIND SCIENCE & TECHNOLOGY CO., LTD., Xinjiang (CN)

(72) Inventors: Zhongchuan Jiang, Beijing (CN); Aisikaer, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 30 days.

(21) Appl. No.: 17/906,710

(22) PCT Filed: Sep. 14, 2020

(86) PCT No.: PCT/CN2020/115061
§ 371 (c)(1),
(2) Date: Sep. 19, 2022

(87) PCT Pub. No.: WO2021/184702
PCT Pub. Date: Sep. 23, 2021

(65) Prior Publication Data
US 2023/0208145 A1    Jun. 29, 2023

(30) Foreign Application Priority Data
Mar. 19, 2020    (CN) .......................... 202010195403.1

(51) Int. Cl.
*H02J 3/38*    (2006.01)
*H02J 3/01*    (2006.01)
(Continued)

(52) U.S. Cl.
CPC ................ *H02J 3/381* (2013.01); *H02J 3/01* (2013.01); *H02M 1/0043* (2021.05); *H02M 1/12* (2013.01);
(Continued)

(58) Field of Classification Search
CPC .......... H02J 3/381; H02J 3/01; H02J 2300/28; H02M 1/0043; H02M 1/12; H02M 7/493; H02M 7/53871
See application file for complete search history.

(56) References Cited

U.S. PATENT DOCUMENTS 7,728,451 B2    6/2010 Ichinose et al.
2021/0040936 A1*    2/2021 Busker .................. F03D 7/0284

FOREIGN PATENT DOCUMENTS

CN    102664413 A    9/2012
CN    104678302 A    6/2015
(Continued)

OTHER PUBLICATIONS

The International Search Report dated Dec. 18, 2020; PCT/CN2020/115061.
(Continued)

*Primary Examiner* — Daniel Cavallari
(74) *Attorney, Agent, or Firm* — Frank Gao, Esq.

(57) ABSTRACT

Disclosed are a regulation method and a regulation device for a converter of a wind turbine generator in a wind power plant. The regulation method comprises: acquiring real-time voltage and current signals of a grid connection point (701); acquiring real-time state information of each wind turbine generator on the same electrical circuit in a wind power plant (702); and generating a unified regulation instruction on the basis of the acquired real-time voltage and current signals and the acquired real-time state information (703). The real-time state information comprises the total number of
(Continued)

three-phase bridge arms of converters of currently running wind turbine generators on the same electrical circuit in the wind power plant, serial numbers that are dynamically allocated for the converters of the currently running wind turbine generators and their respective three-phase bridge arms, and the real-time power of each currently running wind turbine generator. The unified regulation instruction comprises a regulation instruction for the converter of each currently running wind turbine generator, wherein the regulation instruction comprises a phase shift angle reference value of a carrier, a carrier ratio reference value, and a characteristic quantity reference value of a modulated wave, which are required for the regulation of each three-phase bridge arm in the converter.

19 Claims, 6 Drawing Sheets (51) Int. Cl.
*H02M 1/00* (2006.01)
*H02M 1/12* (2006.01)
*H02M 7/493* (2007.01)
*H02M 7/5387* (2007.01)

(52) U.S. Cl.
CPC ....... *H02M 7/493* (2013.01); *H02M 7/53871* (2013.01); *H02J 2300/28* (2020.01)

(56) References Cited

FOREIGN PATENT DOCUMENTS

| | | | |
|---|---|---|---|
| CN | 106685239 A | | 5/2017 |
| CN | 107769264 A | * | 3/2018 |
| CN | 107769264 A | | 3/2018 |
| CN | 109193819 A | | 1/2019 |
| EP | 3376657 A1 | | 9/2018 |
| EP | 3608538 A1 | * | 2/2020 |
| WO | 2018/184747 A1 | | 10/2018 |

OTHER PUBLICATIONS

The Extended European Search Report dated Aug. 14, 2023; Appln. No. 20925395.4.

* cited by examiner

REGULATION METHOD AND REGULATION DEVICE FOR CONVERTER OF WIND TURBINE GENERATOR IN WIND POWER PLANT

This application is the U.S. national phase of International Application No. PCT/CN2020/115061, titled "REGULATION METHOD AND REGULATION DEVICE FOR CONVERTER OF WIND TURBINE GENERATOR IN WIND POWER PLANT", filed on Sep. 14, 2020, which claims priority to Chinese Patent Application No. 202010195403.1, titled "METHOD AND APPARATUS FOR REGULATING CONVERTER OF WIND TURBINE IN WIND FARM", filed on Mar. 19, 2020, with the China National Intellectual Property Administration, both of which are incorporated herein by reference in their entirety.

FIELD

The present disclosure generally relates to the technology field of regulation of wind turbines, and in particular to a method and apparatus for unified regulation and control of converters of wind turbines on a same collecting line in a wind farm.

BACKGROUND

Figure 1:
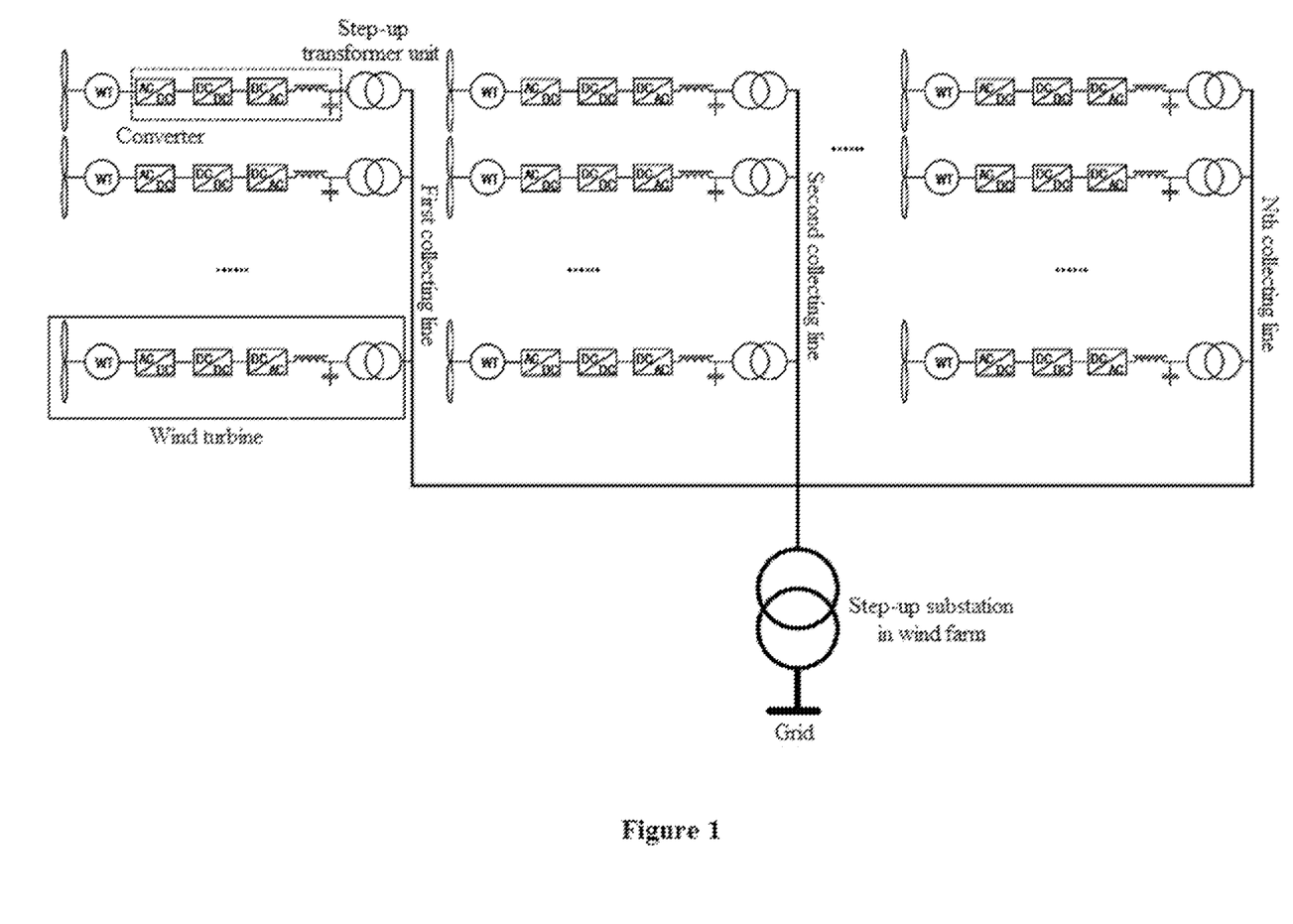
FIG. 1 shows a schematic diagram of an existing typical design of a wind farm.

At present, an existing typical design for a wind farm is shown in FIG. 1. It has the following basic characteristics: (1) for the wind farm, all wind turbines in the wind farm have the exactly same internal topology (a subsystem in the solid-line box); (2) for the wind turbine, full-power converters have the exactly same internal topology (a subsystem in the dashed-line box), and the same control strategy; and (3) according to technical requirements of relevant technical standards and design practice of conventional projects, a rated capacity of each of collecting lines (for example, the first to $n^{th}$ collecting lines) shall not exceed 30 MW.

On the basis of above, the existing typical design for the wind farm may be deemed to have the following disadvantages: (1) all converters are modulated according to the same modulation strategy, and a switching frequency of an IGBT is high, which causes an increase of converter loss; and (2) the same LC filter circuit is provided at a grid side of each of the full-power converters, which, though playing a positive role in harmonic suppression, causes an increase of a total cost of the wind farm.

SUMMARY

Exemplary embodiments of the present disclosure aim to overcome the above disadvantages of large loss of the converters and high overall costs of the wind farm.

A method for regulating converters of wind turbines in a wind farm is provided according to an aspect of the present disclosure. The method includes: obtaining real-time voltage and current signals at a point of common coupling; obtaining real-time status information of wind turbines on a same collecting line in the wind farm; and generating a unified regulation instruction based on the real-time voltage and current signals and the real-time status information as obtained. The real-time status information includes: a total number of three-phase bridge arms of converters of currently running wind turbines on the same collecting line in the wind farm, serial numbers dynamically assigned to the converters of the currently running wind turbines and the three-phase bridge arms of the converters, and a real-time power of each of the currently running wind turbines; and the unified regulation instruction includes regulation instructions for all the converters of the currently running wind turbines. The regulation instruction includes a reference value of a phase shift angle and a reference value of a carrier ratio of a carrier, and a reference value of a characteristic quantity of a modulated wave, for regulation of each of three-phase bridge arms in a respective converter.

An apparatus for regulating converters of wind turbines in a wind farm is provided according to another aspect of the present disclosure. The apparatus includes:
 a processor; and
 a memory, which stores a computer program thereon, where the computer program, when being executed by the processor, implements the foregoing method for regulating converters of wind turbines in a wind farm.

A computer-readable storage medium with instructions stored thereon is provided according to another aspect of the present disclosure. The instructions, when being executed by at least one processor, cause the at least one processor to implement the foregoing method for regulating converters of wind turbines in a wind farm.

With the method and apparatus for regulating converters of wind turbines in a wind farm according to the present disclosure, the phase shift angle of the reference carrier for modulation of each of the three-phase bridge arms is dynamically provided using phase-shifting carrier technology, by collectively considering all the three-phase bridge arms of all the converters on the same collecting line, which greatly reduces the harmonic content of a final resultant current on the collecting line, so that the size, weight and cost of an LC filter at the grid side of each of the converters can be reduced, and the LC filter at the grid side of each of the converters can be even cancelled under certain conditions.

In addition, with the method and apparatus for regulating converters of wind turbines in a wind farm according to the present disclosure, the reference value of the switching frequency and the reference value of a phase angle at a PCC (point of common coupling) for modulation of each three-phase bridge arm are dynamically provided using the phase-shifting carrier technology, by collectively considering all the three-phase bridge arms of all the converters on the same collecting line, so that the switching frequency of an IGBT of each of the three-phase bridge arms is reduced, an efficiency of the converters is improved, and a dynamic error of a phase-locked loop of each of the converters is eliminated, thereby improving grid coupling performance of the wind turbines.

BRIEF DESCRIPTION OF THE DRAWINGS

The above and/or additional aspects and advantages of the present disclosure will become apparent for better understanding with reference to the following description of embodiments in conjunction with the accompanying drawings, in which.

DETAILED DESCRIPTION OF THE EMBODIMENTS

The following description with reference to the accompanying drawings is provided to assist in a comprehensive understanding of embodiments of the present disclosure as defined by the claims and equivalents thereof. Various specific details are included to aid in understanding, but are only to be regarded as exemplary. Accordingly, those of ordinary skill in the art will recognize that various changes and modifications may be made to the embodiments described herein without departing from the scope and spirit of the present disclosure. In addition, the description of well-known functions and constructions is omitted for clarity and conciseness.

Figure 2:
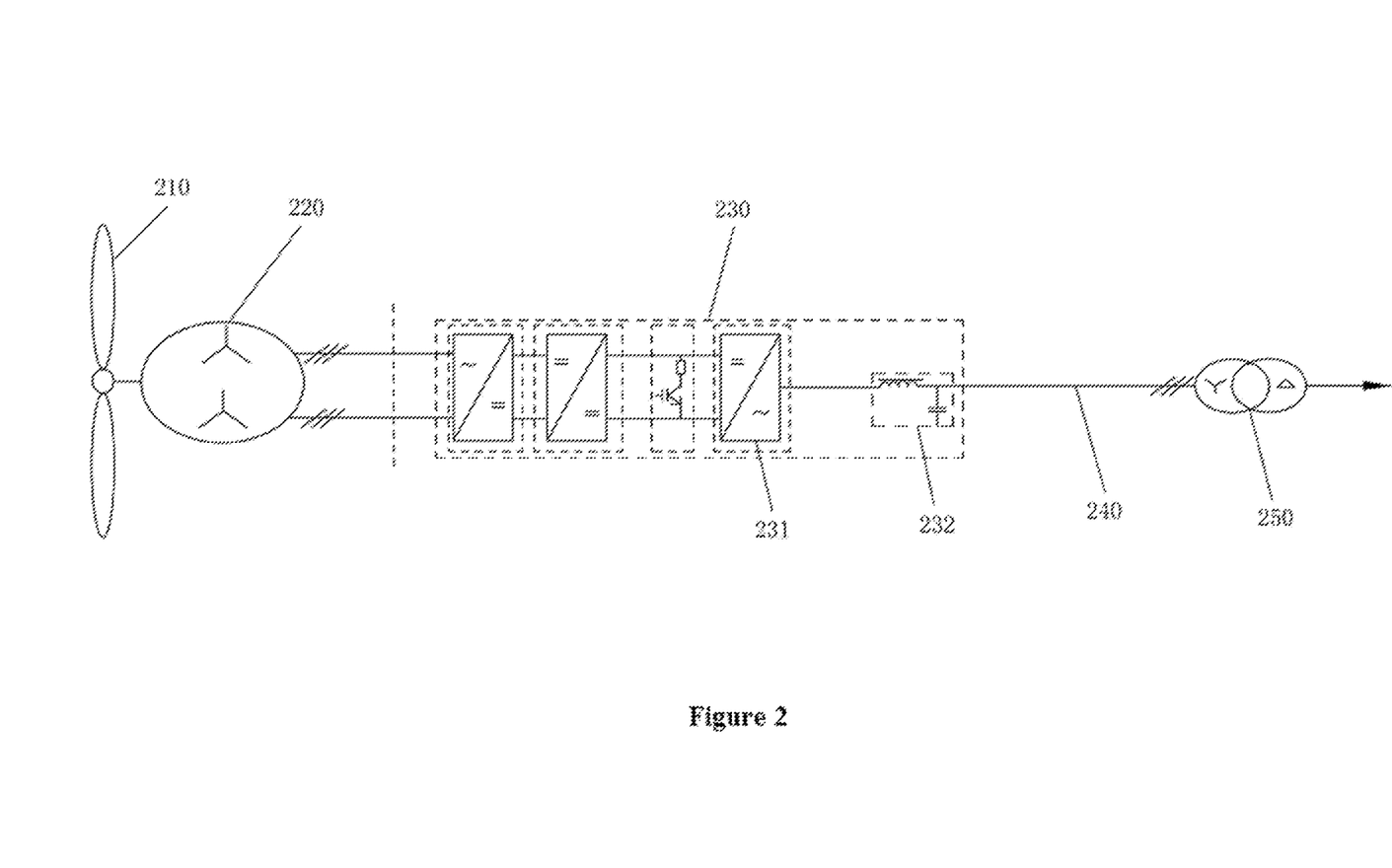
FIG. 2 shows a schematic diagram illustrating the structure of a wind turbine in an existing typical design of a wind farm.

FIG. 2 shows a schematic diagram illustrating the structure of a wind turbine in an existing typical design of a wind farm.

As shown in FIG. 2, the wind turbine may include blades 21, a permanent magnet synchronous generator 220, a full-power converter 230, a grid-side power cable 240 of the full-power converter, and a step-up transformer unit 250.

The blades 210 driven by wind speed rotate at a low speed with the permanent magnet synchronous generator 220, to convert wind energy into electrical energy. A frequency and a voltage amplitude of the electrical energy outputted by the permanent magnet synchronous generator 220 vary with the wind speed. Therefore, the full-power converter 230 is provided to obtain electrical energy with constant amplitude and frequency which are acceptable to the power grid. The full-power converter 230 includes an inverter unit of the full-power converter 231 and a filter unit of the full-power converter 232. An electrical characteristic at the grid side of the wind turbine is completely realized by the inverter unit of the full-power converter 231 and a controller for the inverter unit of the full-power converter 231. The suppression of harmonics at the grid side is achieved on the electrical energy outputted by the inverter unit of the full-power converter 231 by means of the filter unit of the full-power converter 232. Finally, the power outputted by a single wind turbine is supplied to an internal power grid of the wind farm through the grid-side power cable 240 of the full-power converter and the step-up transformer unit 250.

Figure 3:
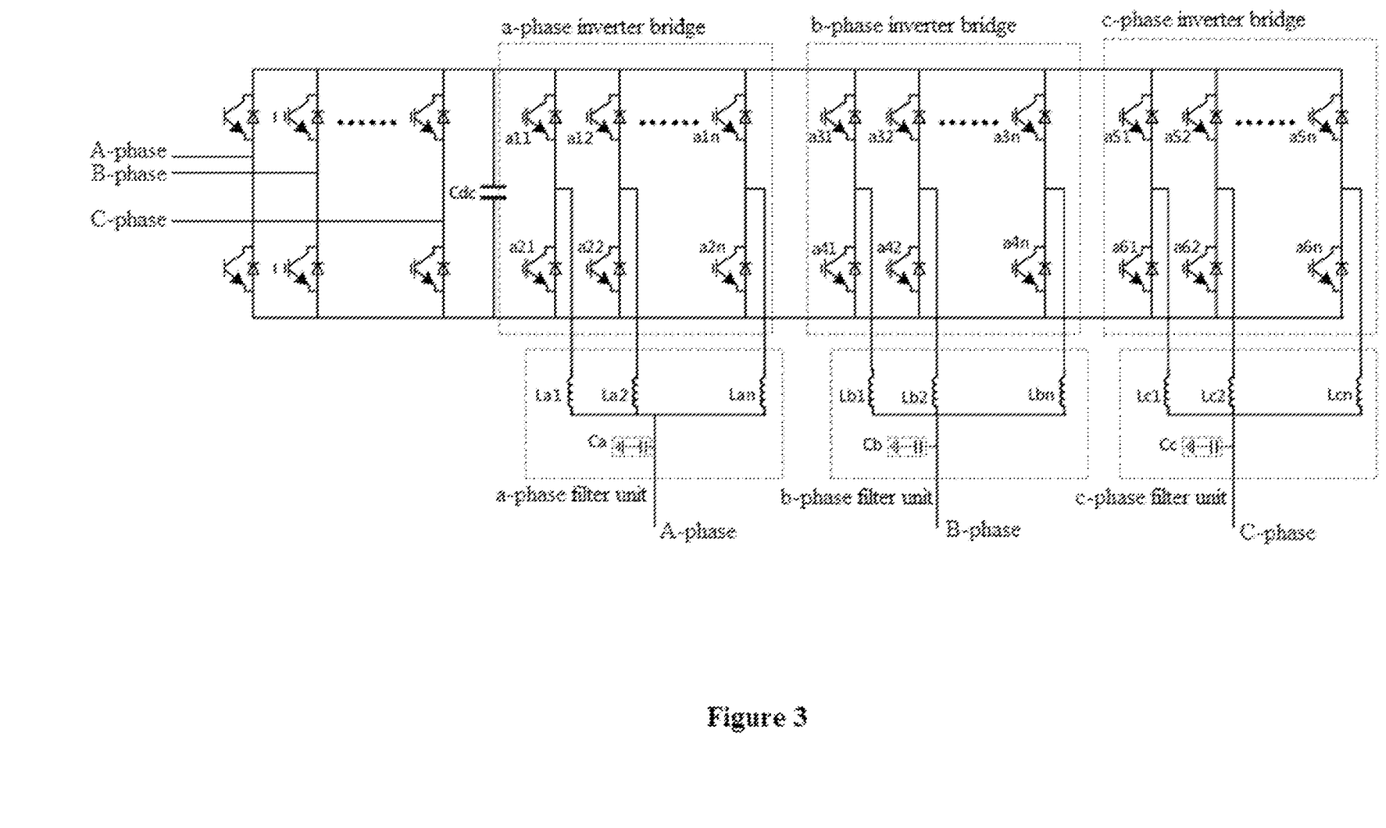
FIG. 3 shows a schematic diagram illustrating the structure of a full-power converter in a wind turbine.

FIG. 3 shows a schematic diagram illustrating the structure of a full-power converter in a wind turbine.

As shown in FIG. 3, due to isolation functionality of a DC-side capacitor of the full-power converter (hereinafter abbreviated as converter), a grid coupling characteristic at the grid side of the wind turbine is mainly related to a grid-side inverter of the full-power converter and the control on the grid-side inverter. As shown in the dotted box in FIG. 3, the inverter may include three three-phase inverter bridges (hereinafter abbreviated as three-phase bridges), namely, an a-phase three-phase bridge, a b-phase three-phase bridge, and a c-phase three-phase bridge. Theoretically, a topology of each phase in the inverter may be designed to have infinite layers by "multiplication". For example, for upper arms of phase a, there may be multiple parallel-connected power modules, a11 to a1*n*. In practice, a "double" design is most widely used in general engineering cases. That is, only upper bridge arms a11, a12 and lower bridge arms a21, a22 are provided for phase a (phase b and phase c can be designed in a similar manner). Carrier signals of the two bridge arms are staggered by 180 degrees from each other. The advantage of the design lies in that harmonic content at the grid side can be reduced effectively.

Figure 4:
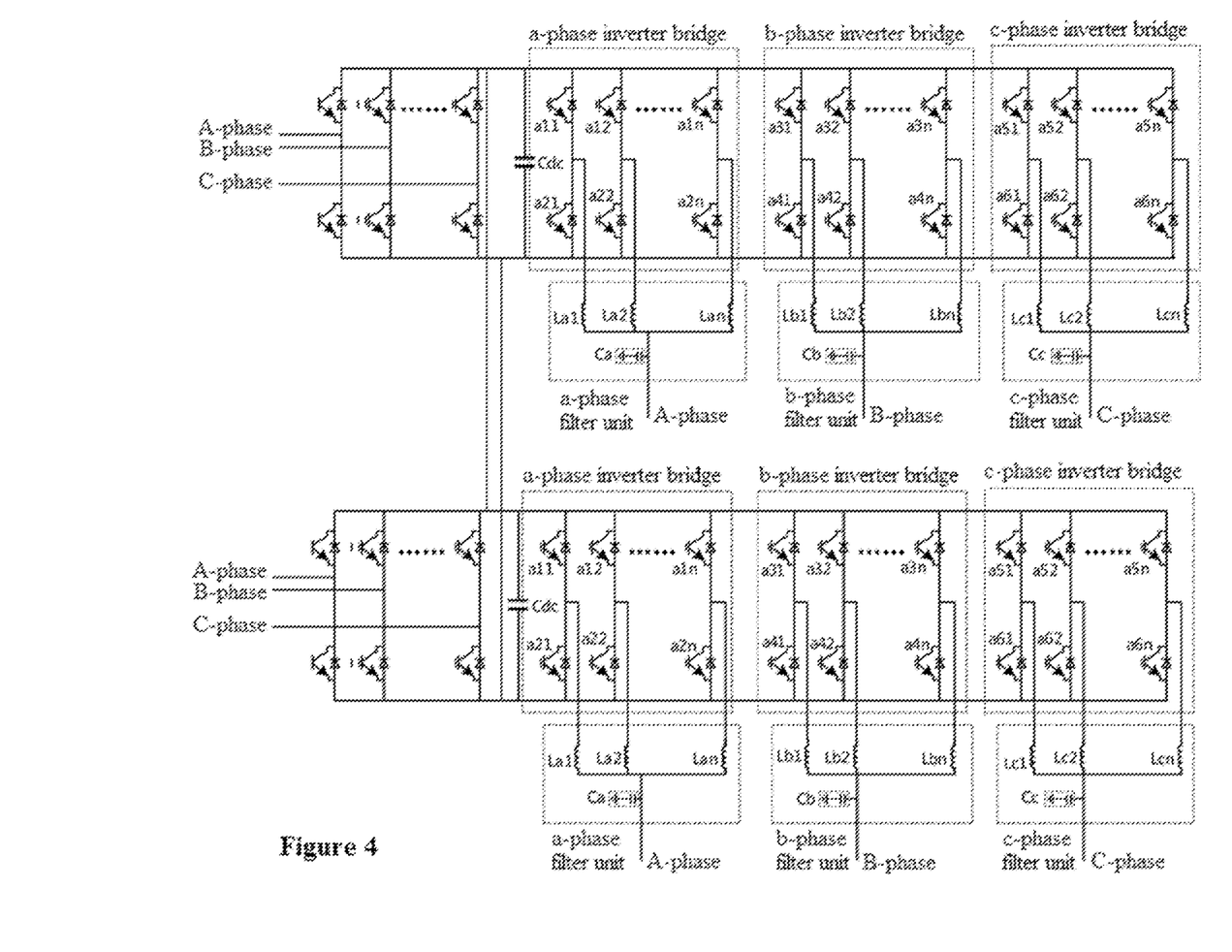
FIG. 4 shows a schematic diagram illustrating the structure of a double-parallel type converter.

In addition, the converters may operate in parallel, and the number of parallel connections may be increased infinitely based on the magnitude of a desired power. Therefore, in order to increase a power level of the converter, the above a-phase three-phase bridge, b-phase three-phase bridge, and c-phase three-phase bridge may multiply to have a parallel structure. FIG. 4 shows a schematic diagram illustrating the structure of a double-parallel type converter. As shown in FIG. 4, the double-parallel type converter may include 6 three-phase bridges. Similarly, a triple-parallel converter may include 9 three-phase bridges, a quad-parallel converter may include 12 three-phase bridges, and so on.

The above description teaches that if there are m converters on a collecting line and each converter includes n three-phase bridge arms, there are m×n three-phase bridge arms on the collecting line. In a conventional method for regulating three-phase bridge arms, the m×n three-phase bridge arms on one collecting line are modulated according to the same modulation strategy. Such regulating method makes the switching frequency of an IGBT of each of individual three-phase bridge arms high, resulting in an increase of the loss of the converters. In addition, in the regulating method, an LC filter circuit is arranged at the grid side of each of the converters to suppress harmonics, which causes an increase of a total cost of the wind farm.

In order to address the above, a method for unifiedly regulating converters of wind turbines on a same collecting line in a wind farm based on carrier phase shifting technology is provided according to the present disclosure. In order to reduce the switching frequency of the IGBT of each three-phase bridge arm and the harmonic content outputted by the converter in view of technical feasibility, carrier signals phase-shifted from each other may be applied to three-phase bridges of multiple converters on the same collecting line, so that current pulsations outputted by the three-phase bridge arms of the multiple converters on the same collecting line also have a certain phase shift. When synthesized on the collecting line, the current pulsations outputted from the three-phase bridge arms are counteracted, thereby greatly reducing the harmonic content of a final resultant current on the collecting line. For this, a phase shift angle of a carrier signal for modulation of an IGBT of each currently running three-phase bridge arm need to be calculated. In addition, the magnitude of the switching frequency of the IGBT of each three-phase bridge arm or a modulation depth of the three-phase inverter bridge depends on a carrier ratio of the carrier signal and the characteristic quantity (including a phase angle and an amplitude) of a modulated wave signal. The reference values of the two parameters depend on a harmonic governance index and a grid phase index at the PCC of the collecting line. In the case that the harmonic governance index and the grid phase index are determined, the phase shift angle and the carrier ratio of the carrier signal, and the characteristic quantity of the modulated wave for modulation of an IGBT of each currently running three-phase bridge arm may be calculated based on the real-time current and voltage signals at the PCC of the collecting line and dynamic information about the converters of the currently running wind turbines on the collecting line and the three-phase bridge arms of the converters. Therefore, a general idea of the present disclosure is to dynamically analyze the harmonic content at the PCC on the same collecting line through collecting the real-time current and voltage signals at the PCC on the same collecting line, and to dynamically determine, in conjunction with a dynamic number of the currently running wind turbines on the collecting line, regulation instructions for modulation of the currently running three-phase bridge arms. The regulation instruction includes a reference value of a phase shift angle and a reference value of a carrier ratio of a reference carrier, and a reference value of a characteristic quantity of a modulated wave, for modulation of each currently running three-phase bridge arm.

The apparatus for regulating converters of wind turbines in a wind farm and the method thereof according to exemplary embodiments of the present disclosure is described in detail hereinafter with reference to FIG. 5 to FIG. 7.

Figure 5:
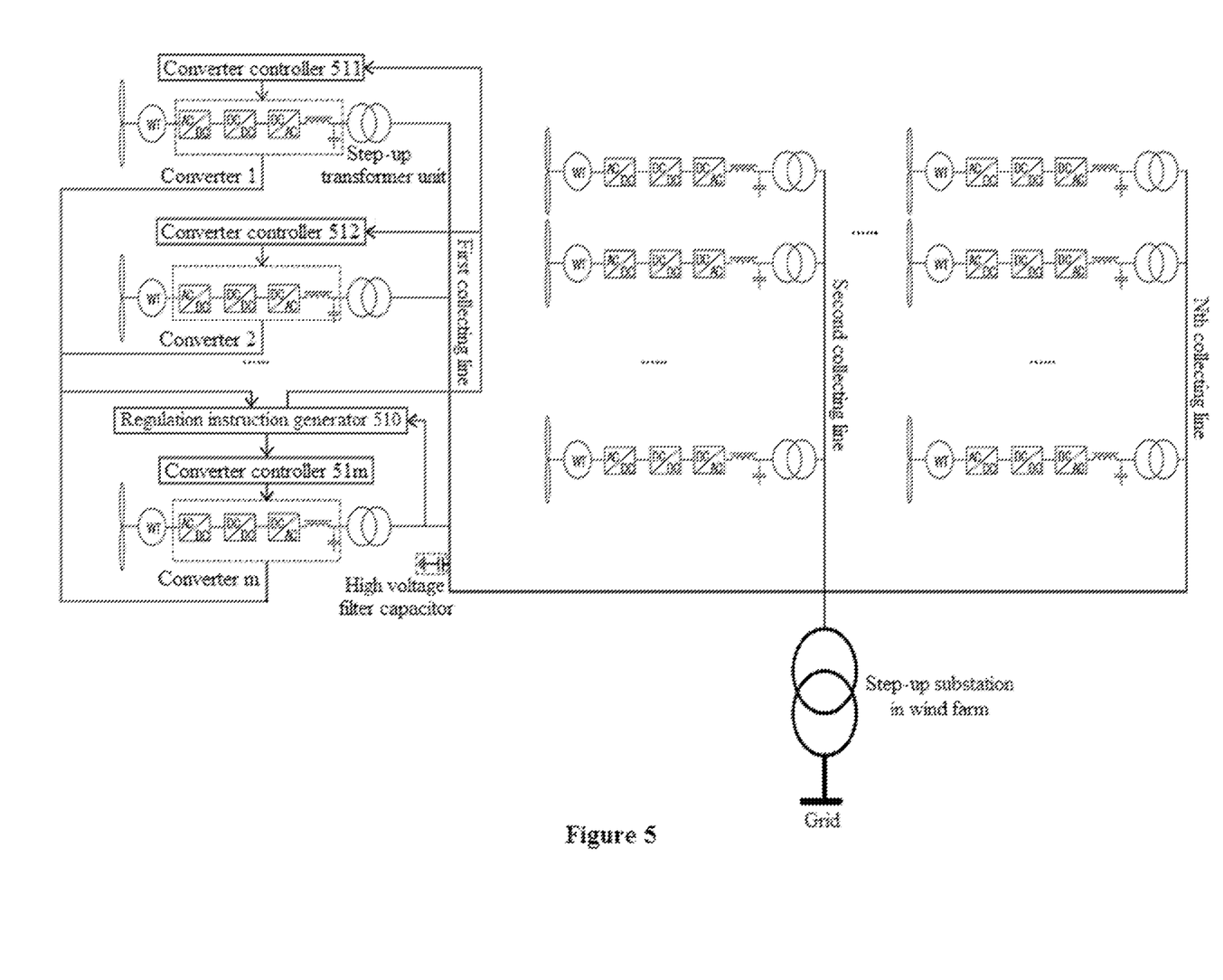
FIG. 5 shows a schematic diagram illustrating regulating converters of wind turbines in a wind farm according to an exemplary embodiment of the present disclosure.

FIG. 5 shows a schematic diagram illustrating regulation of converters of wind turbines in a wind farm according to an exemplary embodiment of the present disclosure.

As shown in FIG. 5, the apparatus for regulating converters of wind turbines in a wind farm according to an exemplary embodiment of the present disclosure may include a regulation instruction generator (e.g., 510). The regulation instruction generator is configured to generate regulation instructions for modulation of all the currently running three-phase bridge arms on the same collecting line, and transmit the regulation instruction for modulation of each currently running three-phase bridge arm to a corresponding converter controller. The apparatus for regulating converters of wind turbines in a wind farm according to an exemplary embodiment of the present disclosure may further include multiple converter controllers (for example, 511 to 51$m$). Each converter in wind turbines on the collecting line in the wind farm is provided with a converter controller. On receiving a regulation instruction from the regulation instruction generator for modulation of the three-phase bridge arms of a converter corresponding to the converter controller, the converter controller may modulate the three-phase bridge arms of the corresponding converter based on the received regulation instruction. For example, a converter controller 511 may be provided for a converter 1, and the converter controller 511 may receive a regulation instruction intended for the converter 1 in a unified regulation instruction, and modulate three-phase bridge arms of the converter 1 based on the regulation instruction intended for the converter 1. A converter controller 512 may be provided for a converter 2, and the converter controller 512 may receive a regulation instruction intended for the converter 2 in the unified regulation instruction, and modulate three-phase bridge arms in the converter 2 based on the regulation instruction intended for the converter 2, and so on.

According to an exemplary embodiment of the present disclosure, the regulation instruction generator may be integrated in a converter controller or in a converter cabinet that is located closest to the PCC on a respective collecting line, so as to dynamically collect real-time current and voltage signals at the PCC on the respective collecting line, and dynamically collect real-time status information (for example, a total number of three-phase bridge arms of converters of currently running wind turbines, or the like) of all currently running wind turbines on the respective collecting line. In practice, the present disclosure is not limited thereto, and the regulation instruction generator may be provided in any feasible location. For example, the regulation instruction generator may also be provided as a separate controller unit.

As shown in FIG. 5, the regulation instruction generator 510 may be integrated in the last (i.e., closest to the PCC) converter controller (e.g., 51$m$) on a first collecting line. Similarly, a regulation instruction generator (not shown) may be integrated in the last converter controller on each of a second collecting line to an $n^{th}$ collecting line. The following description will be given by taking the regulation instruction generator 510 on the first collecting line as an example.

Figure 6:
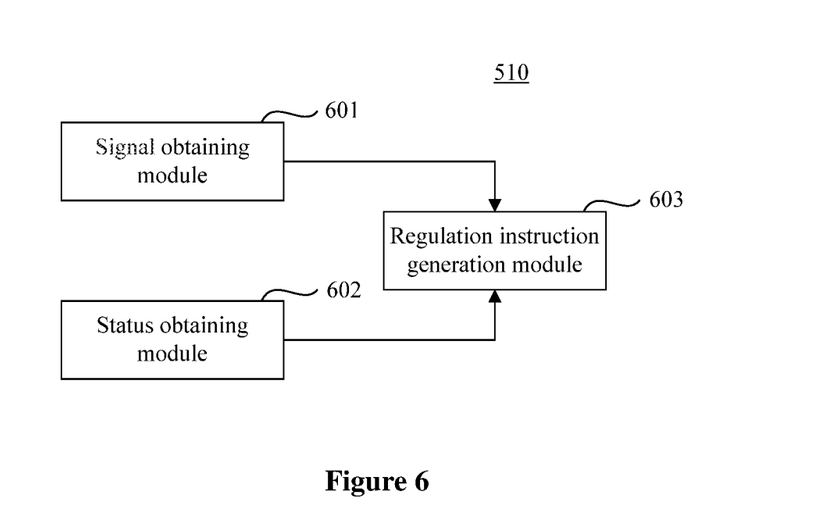
FIG. 6 shows a block diagram illustrating a regulation instruction generator according to an exemplary embodiment of the present disclosure.

FIG. 6 shows a block diagram illustrating a regulation instruction generator 510 according to an exemplary embodiment of the present disclosure.

As shown in FIG. 6, the regulation instruction generator 510 may include a signal obtaining module 601, a status obtaining module 602 and a regulation instruction generation module 603.

The signal obtaining module 601 may obtain real-time voltage and current signals at a point of common coupling (PCC).

The status obtaining module 602 may obtain real-time status information of wind turbines on a same collecting line in the wind farm.

According to another embodiment of the present disclosure, the real-time status information may include: a total number of three-phase bridge arms of converters of currently running wind turbines on the same collecting line in the wind farm, serial numbers dynamically assigned to the converters of the currently running wind turbines and the three-phase bridge arms of the converters, and a real-time power of each of the currently running wind turbines. Here, the total number n×m of the three-phase bridge arms of the converters of the currently running wind turbines on the same collecting line in the wind farm may be obtained by obtaining a total number m of the converters of the currently running wind turbines on the same collecting line in the wind farm and a number n of three-phase bridge arms in each of the converters on the collecting line.

The regulation instruction generation module 603 may generate a unified regulation instruction based on the real-time voltage and current signals and the real-time status information as obtained. The unified regulation instruction herein includes regulation instructions for converters of individual currently running wind turbine. Each of the regulation instructions includes a reference value of a phase shift angle and a reference value of a carrier ratio of a carrier, and a reference value of a characteristic quantity of a modulated wave, for regulation of each of three-phase bridge arms in a respective converter. For example, the unified regulation instruction may include multiple regulation instructions, each of which may correspond to a respective converter. Each of the regulation instructions includes a reference value of a phase shift angle and a reference value of a carrier ratio of a carrier, and a reference value of a characteristic quantity of a modulated wave for regulation of the three-phase bridge arms in a respective converter, to control the three-phase bridge arms in the respective converter.

The method for generating the unified regulation instruction by the regulation instruction generation module 603 according to an exemplary embodiment of the present disclosure is described in detail hereinafter.

Harmonic control is a closed-loop control. That is, the carrier ratio and the phase shift angle of a carrier signal of each of the three-phase bridge arms are controlled according to a difference between current harmonics data at the PCC on the collecting line and a harmonic governance index, so as to achieve harmonic governance. For three-phase bridge arms of a same converter, reference values of carrier ratios of carrier signals may be the same, and reference values of phase shift angles of the carrier signals may be different.

According to an exemplary embodiment of the present disclosure, the regulation instruction generation module 603 may calculate a total current harmonic content of the PCC based on the real-time voltage and current signals at the PCC obtained by the signal obtaining module 601; compare the calculated total current harmonic content with an index value of total current harmonic content; and calculate the reference value of the carrier ratio of the carrier signal, based on a difference between the calculated total current harmonic content and the index value of total current harmonic content as well as the real-time power of each of the currently running wind turbines obtained by the status obtaining module 602. The index value of total current harmonic content herein may be preset according to a determined harmonic index, or may be preset according to user requirements, or may be a default value. In addition, the reference value of the carrier ratio of the carrier signal may be calculated by using an open-loop ramp approximation method, while in practice, the present disclosure is not limited thereto.

According to an exemplary embodiment of the present disclosure, the regulation instruction generation module 603 may calculate the reference value of the phase shift angle of the carrier for regulation of each of the three-phase bridge arms in the converters of each currently running wind turbine, based on the real-time status information obtained by the status obtaining module 602 and the calculated reference value of the carrier ratio.

According to an exemplary embodiment of the present disclosure, the regulation instruction generation module 603 may calculate the reference value of the phase shift angle of the carrier for regulation of each of the three-phase bridge arms of the converters of each currently running wind turbine based on the following formula 1.

$$\theta_i = \frac{2 \times \pi \times i}{n \times m \times k_j}, \quad \text{[Formula 1]}$$

$\theta_i$ represents a reference value of a phase shift angle of a carrier for an $i^{th}$ three-phase bridge arm, m represents a total number of converters of currently running wind turbines on the same collecting line in the wind farm, n represents a number of three-phase bridge arms in each converter on the collecting line, i represents a serial number of a currently running three-phase bridge arm, $k_j$ represents a reference value of a carrier ratio of a carrier for a $j^{th}$ converter, and j represents a serial number of a currently running converter.

In addition, the characteristic quantity of the modulated wave for the regulation of each of the three-phase bridge arms of the converters of each currently running wind turbines may include a phase angle and an amplitude of the modulated wave.

According to an exemplary embodiment of the present disclosure, the regulation instruction generation module 603 may calculate a grid phase angle at the PCC based on the real-time voltage and current signals at the PCC obtained by the signal obtaining module 601, and determine a reference value of the phase angle of the modulated wave based on the calculated grid phase angle. In addition, the regulation instruction generation module 603 may determine a reference value of the amplitude of the modulated wave based on an amplitude command value of the modulated wave.

In addition, for harmonics of specific orders that exceed limits, a reverse harmonic current may be injected into the line by some of the converters, by using "current-source" characteristic of the converter, so as to achieve the purpose of governance of the harmonics of specific orders.

According to an exemplary embodiment of the present disclosure, the regulation instruction generation module 603 may calculate a harmonic content of a specific order at the PCC based on the real-time voltage and current signals at the PCC obtained by the signal obtaining module 601; compare the calculated harmonic content of the specific order with a command value of harmonic content of the specific order; calculate, in response to a difference between the calculated harmonic content of the specific order and the command value of the harmonic content of the specific order exceeding a predetermined threshold, a reference value of a reverse current injection amount of harmonic of the specific order, based on the difference between the calculated harmonic content of the specific order and the command value of the harmonic content of the specific order; and insert the calculated reference value of the reverse current injection amount of the harmonic of the specific order into the unified regulation instruction.

In addition, according to an exemplary embodiment of the present disclosure, the regulation instruction generator 510 may further include a transmitter (not shown). In a case that the regulation instruction generator 510 generates the unified regulation instruction, the transmitter of the regulation instruction generator 510 may transmit the regulation instructions for the converters of each currently running wind turbine to converter controllers of the converters respectively. According to an exemplary embodiment of the present disclosure, the transmitter of the regulation instruction generator 510 may transmit the regulation instructions through a high-speed optical fiber communication network or a private network.

Referring back to FIG. 5, each of the converter controllers 511 to 51*m* may regulate each of the three-phase bridge arms in a respective converter based on a received regulation instruction.

According to an exemplary embodiment of the present disclosure, each of the converter controllers 511 to 51*m* may perform the following operations for each of the three-phase bridge arms of the respective converter: determining a carrier and a modulated wave for modulation of an IGBT on each of the three-phase bridge arms, based on the reference value of the phase shift angle of the carrier calculated for the three-phase bridge arm of the respective converter, the reference value of the carrier ratio of the carrier calculated for the respective converter and the reference value of the characteristic quantity of the modulated wave calculated for the collecting line corresponding to the respective converter; generating a trigger pulse sequence for the IGBT on each of the three-phase bridge arms, based on the determined carrier and the modulated wave for modulation of the IGBT on each of the three-phase bridge arms; and modulating the IGBT on each of the three-phase bridge arms based on the generated trigger pulse sequence for the IGBT on each of the three-phase bridge arms.

According to an exemplary embodiment of the present disclosure, in response to the unified regulation instruction including the reference value of the reverse current injection amount of the harmonic of the specific order, some of the converter controllers 511 to 51*m* may control corresponding converters to inject a reverse harmonic current into the collecting line based on the reference value of the reverse current injection amount of the harmonic of the specific order.

According to the exemplary embodiment of the present disclosure, a converter of a wind turbine in a specific state is prevented from injecting a reverse harmonic current into the collecting line corresponding to the converter. For example, the wind turbine in the specific state may include a wind turbine running at full power, a wind turbine with very small real-time power, a wind turbine in a power-limited state, a wind turbine mounted with experimental equipment, and so on. Therefore, each of the converter controllers 511 to 51m may monitor the real-time power of the respective converter, and control the respective converter to inject the reverse harmonic current into the collecting line corresponding to the converter based on the reference value of the reverse current injection amount of the harmonic of the specific order, in response to the real-time power of the respective converter reaching a predetermined threshold (e.g., 70% to 80% of the power in the full power state).

According to an exemplary embodiment of the present disclosure, each of the converter controllers 511 to 51m may compare the reference value of the phase angle at the PCC (i.e., the obtained reference value of the phase angle of the modulated wave) calculated in real time for the collecting line corresponding to the converter controller with a phase-locking result of a phase-locked loop of the respective converter, and compensate for a phase-locking error.

Figure 7:
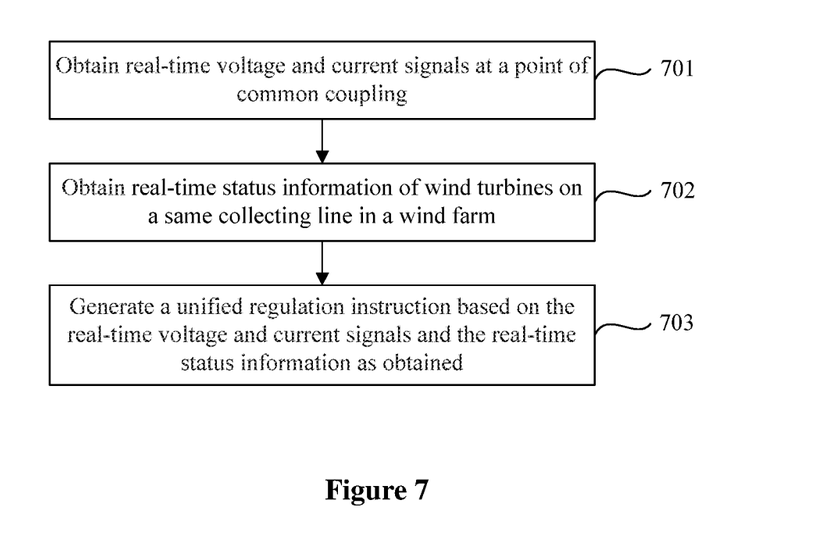
FIG. 7 is a flowchart illustrating a method for regulating converters of wind turbines in a wind farm according to an exemplary embodiment of the present disclosure.

FIG. 7 is a flowchart illustrating a method for regulating converters of wind turbines in a wind farm according to an exemplary embodiment of the present disclosure.

In step 701, the signal obtaining module 601 may obtain real-time voltage and current signals at a point of common coupling (PCC).

In step 702, the status obtaining module 602 may obtain real-time status information of wind turbines on a same collecting line in the wind farm.

According to an exemplary embodiment of the present disclosure, the real-time status information may include: a total number of three-phase bridge arms of converters of currently running wind turbines on the same collecting line in the wind farm, serial numbers dynamically assigned to the converters of the currently running wind turbines and the three-phase bridge arms of the converters, and a real-time power of each of the currently running wind turbines. Here, the total number n×m of the three-phase bridge arms of the converters of the currently running wind turbines on the same collecting line in the wind farm may be obtained by obtaining a total number m of the converters of the currently running wind turbines on the same collecting line in the wind farm and a number n of three-phase bridge arms in each of the converters on the collecting line.

In addition, since the signal obtaining module 601 and the status obtaining module 602 both obtaining data in real time, there is no restriction on the execution order of steps 701 and 702. Steps 701 and 702 may be performed sequentially or simultaneously, or step 702 may be performed before step 701.

In step 703, the regulation instruction generation module 603 may generate a unified regulation instruction based on the real-time voltage and current signals and the real-time status information as obtained. The unified regulation instruction herein includes regulation instructions for converters of each currently running wind turbine. Each of the regulation instructions includes a reference value of a phase shift angle and a reference value of a carrier ratio of a carrier, and a reference value of a characteristic quantity of a modulated wave, for regulation of each of three-phase bridge arms in a respective converter. For example, the unified regulation instruction may include multiple regulation instructions, each of which may correspond to a respective converter. Each of the regulation instructions includes a reference value of a phase shift angle and a reference value of a carrier ratio of a carrier, and a reference value of a characteristic quantity of a modulated wave for regulation of the three-phase bridge arms in a respective converter, to control the three-phase bridge arms in the respective converter.

The method for generating the unified regulation instruction by the regulation instruction generation module 603 according to an exemplary embodiment of the present disclosure will be described in detail hereinafter.

According to an exemplary embodiment of the present disclosure, the regulation instruction generation module 603 may calculate a total current harmonic content of the PCC based on the real-time voltage and current signals at the PCC obtained by the signal obtaining module 601; compare the calculated total current harmonic content with an index value of total current harmonic content; and calculate the reference value of the carrier ratio of the carrier signal, based on a difference between the calculated total current harmonic content and the index value of total current harmonic content and the real-time power of each of the currently running wind turbines obtained by the status obtaining module 602. The index value of total current harmonic content herein may be preset according to a determined harmonic index, or may be preset according to user requirements, or may be a default value. In addition, the reference value of the carrier ratio of the carrier signal may be calculated by using an open-loop ramp approximation method, while in practice, the present disclosure is not limited thereto.

According to an exemplary embodiment of the present disclosure, the regulation instruction generation module 603 may calculate the reference value of the phase shift angle of the carrier for regulation of each of the three-phase bridge arms in the converters of each currently running wind turbine, based on the real-time status information obtained by the status obtaining module 602 and the calculated reference value of the carrier ratio.

According to an exemplary embodiment of the present disclosure, the regulation instruction generation module 603 may calculate the reference value of the phase shift angle of the carrier for regulation of each of the three-phase bridge arms of the converters of each currently running wind turbine based on the following formula 1.

$$\theta_i = \frac{2 \times \pi \times i}{n \times m \times k_j}, \qquad \text{[Formula 1]}$$

$\theta_i$ represents a reference value of a phase shift angle of a carrier for an $i^{th}$ three-phase bridge arm, m represents a total number of converters of currently running wind turbines on the same collecting line in the wind farm, n represents a number of three-phase bridge arms in each converter on the collecting line, i represents a serial number of a currently running three-phase bridge arm, $k_j$ represents a reference value of a carrier ratio of a carrier for a $j^{th}$ converter, and j represents a serial number of a currently running converter.

In addition, the characteristic quantity of the modulated wave for the regulation of each of the three-phase bridge arms of the converters of each currently running wind turbines may include a phase angle and an amplitude of the modulated wave.

According to an exemplary embodiment of the present disclosure, the regulation instruction generation module 603 may calculate a grid phase angle at the PCC based on the real-time voltage and current signals at the PCC obtained by the signal obtaining module 601, and determine a reference value of the phase angle of the modulated wave based on the calculated grid phase angle. In addition, the regulation instruction generation module 603 may determine a reference value of the amplitude of the modulated wave based on an amplitude command value of the modulated wave.

In addition, for harmonics of specific orders that exceed limits, a reverse harmonic current may be injected into the line by some of the converters, by using "current source" characteristic of the converter, so as to achieve the purpose of governance of the harmonics of specific orders.

According to an exemplary embodiment of the present disclosure, the regulation instruction generation module 603 may calculate a harmonic content of a specific order at the PCC based on the real-time voltage and current signals at the PCC obtained by the signal obtaining module 601; compare the calculated harmonic content of the specific order with a command value of harmonic content of the specific order; calculate, in response to a difference between the calculated harmonic content of the specific order and the command value of the harmonic content of the specific order exceeding a predetermined threshold, a reference value of a reverse current injection amount of harmonic of the specific order, based on the difference between the calculated harmonic content of the specific order and the command value of the harmonic content of the specific order; and insert the calculated reference value of the reverse current injection amount of the harmonic of the specific order into the unified regulation instruction.

In addition, according to an exemplary embodiment of the present disclosure, the regulation instruction generator 510 may further include a transmitter (not shown). In a case that the regulation instruction generator 510 generates the unified regulation instruction, the transmitter of the regulation instruction generator 510 may transmit the regulation instructions for the converters of each currently running wind turbine to converter controllers of the converters respectively. According to an exemplary embodiment of the present disclosure, the transmitter of the regulation instruction generator 510 may transmit the regulation instructions through a high-speed optical fiber communication network or a private network. According to an exemplary embodiment of the present disclosure, the method for regulating converters of wind turbines in a wind farm further includes: regulating, by each of the converter controllers 511 to 51$m$, each of the three-phase bridge arms in a respective converter based on a received regulation instruction.

A method for regulating each of three-phase bridge arms in a respective converter by each of the converter controllers 511 to 51$m$ according to an exemplary embodiment of the present disclosure is described in detail hereinafter.

According to an exemplary embodiment of the present disclosure, each of the converter controllers 511 to 51$m$ may perform the following operations for each of the three-phase bridge arms of the respective converter: determining a carrier and a modulated wave for modulation of an IGBT on each of the three-phase bridge arms, based on the reference value of the phase shift angle of the carrier calculated for the three-phase bridge arm of the respective converter, the reference value of the carrier ratio of the carrier calculated for the respective converter and the reference value of the characteristic quantity of the modulated wave calculated for the collecting line corresponding to the respective converter; generating a trigger pulse sequence for the IGBT on each of the three-phase bridge arms, based on the determined carrier and the modulated wave for modulation of the IGBT on each of the three-phase bridge arms; and modulating the IGBT on each of the three-phase bridge arms based on the generated trigger pulse sequence for the IGBT on each of the three-phase bridge arms.

According to an exemplary embodiment of the present disclosure, in response to the unified regulation instruction including the reference value of the reverse current injection amount of the harmonic of the specific order, some of the converter controllers 511 to 51$m$ may control corresponding converters to inject a reverse harmonic current into the collecting line based on the reference value of the reverse current injection amount of the harmonic of the specific order.

According to the exemplary embodiment of the present disclosure, a converter of a wind turbine in a specific state is prevented from injecting a reverse harmonic current into the collecting line corresponding to the converter. For example, the wind turbine in the specific state may include a wind turbine running at full power, a wind turbine with very small real-time power, a wind turbine in a power-limited state, a wind turbines mounted with experimental equipment, and so on. Therefore, each of the converter controllers 511 to 51$m$ may monitor the real-time power of the respective converter, and control the respective converter to inject the reverse harmonic current into the collecting line corresponding to the converter based on the reference value of the reverse current injection amount of the harmonic of the specific order, in response to the real-time power of the respective converter reaching a predetermined threshold (e.g., 70% to 80% of the power in the full power state).

According to an exemplary embodiment of the present disclosure, each of the converter controllers 511 to 51$m$ may compare the reference value of the phase angle at the PCC (i.e., the obtained reference value of the phase angle of the modulated wave) calculated in real time for the collecting line corresponding to the converter controller with a phase-locking result of a phase-locked loop of the respective converter, and compensate for a phase-locking error.

In addition, according to another exemplary embodiment of the present disclosure, an apparatus for regulating converters of wind turbines in a wind farm may include a processor and a memory. The memory stores a computer program thereon. The computer program, when being executed by the processor, implements the method for regulating converters of wind turbines in a wind farm according to the present disclosure. Furthermore, the apparatus may be integrated in the converter controller that is located closest to the point of common coupling.

In addition, according to another exemplary embodiment of the present disclosure, the method for regulating converters of wind turbines in a wind farm according to the present disclosure may be implemented by a program (or instructions) recorded on a computer-readable storage medium. For example, a computer-readable storage medium storing instructions thereon may be provided. The instructions, when being executed by at least one processor, cause the at least one processor to implement the method for regulating converters of wind turbines in a wind farm according to the present disclosure.

With the method and apparatus for regulating converters of wind turbines in a wind farm according to the present disclosure, the phase shift angle of the reference carrier for modulation of each of the three-phase bridge arms is dynamically provided using phase-shifting carrier technology, by collectively considering all the three-phase bridge arms of all the converters on the same collecting line, which greatly reduces the harmonic content of a final resultant current on the collecting line, so that the size, weight and cost of an LC filter at a grid side of each of the converters can be reduced, and the LC filter at the grid side of each of the converters can be even cancelled under certain conditions.

In addition, with the method and apparatus for regulating converters of wind turbines in a wind farm according to the present disclosure, the reference value of the switching frequency and the reference value of a phase angle at a PCC for modulation of each three-phase bridge arm are dynamically provided using the phase-shifting carrier technology, by collectively considering all the three-phase bridge arms of all the converters on the same collecting line, so that the switching frequency of an IGBT of each of the three-phase bridge arms is reduced, an efficiency of the converters is improved, and a dynamic error of a phase-locked loop of each of the converters is eliminated, thereby improving grid coupling performance of the wind turbines.

The method and apparatus for regulating converters of wind turbines in a wind farm according to the exemplary embodiments of the present disclosure are described above with reference to FIG. 5 to FIG. 7.

The systems, devices, and units shown in FIG. 6 may each be configured as software, hardware, firmware for performing specific functions, or any combination of the above. For example, the systems, devices or units may correspond to special-purpose integrated circuits, pure software codes, or modules combining software and hardware. In addition, one or more functions implemented by the systems, devices or units may further be centrally performed by components in a physical entity device (e.g., a processor, a client, a server, or the like).

Furthermore, the method described with reference to FIG. 7 may be implemented by a program (or instructions) recorded on a computer-readable storage medium. For example, according to an exemplary embodiment of the present disclosure, a computer-readable storage medium for generating a unified regulation instruction for all currently running converters on the same collecting line of a wind farm may be provided. A computer program (or instructions) for performing the steps of generating a unified regulation instruction for all currently running converters on the same collecting line in the wind farm described with reference to FIG. 7 is recorded on the computer readable storage medium.

The above computer program in the computer-readable storage medium may be executed in an environment deployed in computer device such as a client, a host, an agent device, a server, or the like. It should be noted that the computer program may also be used to perform additional steps in addition to the above steps, or more specific processing may be performed when the above steps are performed, and the contents of these additional steps and further processing have been mentioned in the description of the related method with reference to FIG. 7, and thus will not be described in order to avoid repetition.

It should be noted that the regulation instruction generation module 510 according to an exemplary embodiment of the present disclosure may achieve corresponding functions by completely relying on the running of the computer program, that is, the units correspond to the steps in a functional architecture of the computer program, so that the entire system may be invoked by a specific package (for example, a lib library) to implement the corresponding function.

On the other hand, each device shown in FIG. 6 may also be implemented by hardware, software, firmware, middleware, microcode or any combination thereof. When implemented in software, firmware, middleware, or microcode, program codes or code segments for performing corresponding operations may be stored in a computer-readable medium such as a storage medium, so that the corresponding program codes or code segments may be read and executed by a processor to perform the corresponding operations.

For example, the exemplary embodiments according to the present disclosure may further be implemented as a computing device including a memory and a processor. The memory stores a set of computer-executable instructions. The set of computer-executable instructions, when being executed by the processor, executes the step of generating a unified regulation instruction for all currently running converters on the same collecting line in a wind farm according to an exemplary embodiment of the present disclosure.

The computing device may be deployed in a server or a client, or may be deployed on a node device in a distributed network environment. Furthermore, the computing device may be a PC, a tablet device, a personal digital assistant, a smartphone, a web application, or other devices capable of executing the set of instructions described above.

The computing device herein is not necessarily a single computing device, and may also be any set of devices or circuits capable of individually or jointly executing the above instructions (or the set of instructions). The computing device may also be a part of an integrated control system or a system manager, or may be configured as a portable electronic device that interfaces locally or remotely (for example, via wireless transmission).

In the computing device, the processor may include a central processing unit (CPU), a graphics processing unit (GPU), a programmable logic device, a special purpose processor system, a microcontroller, or a microprocessor. By way of example rather than limitation, processors may also include, but not limited to, an analog processor, a digital processor, a microprocessor, a multi-core processor, a processor array, a network processor, or the like.

Some operations described in the calculation method for generating a unified regulation instruction for all currently running converters on the same collecting line of a wind farm according to an exemplary embodiment of the present disclosure may be implemented by software, and some operations may be implemented by hardware. In addition, the operations may also be implemented by means of a combination of software and hardware.

Instructions or codes stored in one of memories may be executed by the processor. The memories may also store data thereon. Instructions and data may also be transmitted and received over a network via a network interface device, where, the network interface device may employ any known transmission protocol.

The memories may be integrated with the processor. For example, a RAM or flash memory may be provided within an integrated circuit microprocessor or the like. Additionally, the memories may include separate devices, such as external disk drives, storage arrays, or any other storage devices that may be used by a database system. The memories and the processor may be operatively coupled, or may communicate with each other, for example, through I/O ports, network connections, or the like, to enable the processor to read files stored in the memories.

In addition, the computing device may also include a video display (such as a liquid crystal display) and a user interaction interface (such as a keyboard, a mouse, a touch input device, or the like). All components of the computing device may be connected to each other via a bus and/or network.

The operations involved in the method of generating a unified regulation instruction for all currently running converters on the same collecting line of a wind farm according to an exemplary embodiment of the present disclosure may be described as various interconnected or coupled functional blocks or functional diagrams. However, these functional blocks or functional diagrams may be equally integrated into a single logical device or be operated with boundaries being non-precise.

Therefore, the method of generating a unified regulation instruction for all currently running converters on the same collecting line of a wind farm as described with reference to FIG. 7 may be implemented by a system comprising at least one computing device and at least one storage device storing instructions thereon.

According to an exemplary embodiment of the present disclosure, the at least one computing device is a computing device for generating a unified regulation instruction for all currently running converters on the same collecting line in a wind farm according to an exemplary embodiment of the present disclosure. The storage device stores a set of computer-executable instructions thereon. The set of computer-executable instructions, when being executed by the at least one computing device, implements the step of generating the unified regulation instruction for all currently running converters on the same collecting line in a wind farm as described with reference to FIG. 7.

Various exemplary embodiments according to the present disclosure have been described above. It should be understood that the above description is merely exemplary and not exhaustive, and the present disclosure is not limited to the disclosed exemplary embodiments. Various modifications and variations will be apparent to those of ordinary skill in the art without departing from the scope and spirit of the present disclosure. Therefore, the scope of protection of the present disclosure should be defined by the scope of the claims.

INDUSTRIAL APPLICABILITY

With the method and apparatus for regulating converters of wind turbines in a wind farm according to the present disclosure, the phase shift angle of the reference carrier for modulation of each of the three-phase bridge arms is dynamically provided using phase-shifting carrier technology, by collectively considering all the three-phase bridge arms of all the converters on the same collecting line, which greatly reduces the harmonic content of a final resultant current on the collecting line, so that the size, weight and cost of an LC filter at a grid side of each of the converters can be reduced, and the LC filter at the grid side of each of the converters can be even cancelled under certain conditions.

The invention claimed is:

1. A method for regulating converters of wind turbines in a wind farm, comprising:
obtaining real-time voltage and current signals at a point of common coupling;
obtaining real-time status information of wind turbines on a same collecting line in the wind farm; and
generating a unified regulation instruction based on the real-time voltage and current signals and the real-time status information as obtained,
wherein the real-time status information comprises: a total number of three-phase bridge arms of converters of currently running wind turbines on the same collecting line in the wind farm, serial numbers dynamically assigned to the converters of the currently running wind turbines and the three-phase bridge arms of the converters, and a real-time power of each of the currently running wind turbines, and
wherein the unified regulation instruction comprises regulation instructions for all the converters of the currently running wind turbines, and each of the regulation instructions comprises a reference value of a phase shift angle and a reference value of a carrier ratio of a carrier, and a reference value of a characteristic quantity of a modulated wave, for regulation of each of three-phase bridge arms in a respective converter.

2. The method according to claim 1, wherein the step of generating the unified regulation instruction comprises:
calculating a total current harmonic content of the point of common coupling based on the real-time voltage and current signals;
comparing the calculated total current harmonic content with an index value of total current harmonic content; and
calculating the reference value of the carrier ratio, based on a difference between the calculated total current harmonic content and the index value of total current harmonic content as well as the real-time power of each of the currently running wind turbines.

3. The method according to claim 2, wherein the step of generating the unified regulation instruction comprises:
calculating the reference value of the phase shift angle of the carrier for regulation of each of the three-phase bridge arms in the converters of each currently running wind turbine, based on the real-time status information and the calculated reference value of the carrier ratio.

4. The method according to claim 3, wherein the step of calculating the reference value of the phase shift angle of the carrier for regulation of each of the three-phase bridge arms in the converters of each currently running wind turbine comprises:
calculating the reference value of the phase shift angle of the carrier based on the following formula:

$$\theta_i = \frac{2 \times \pi \times i}{n \times m \times k_j},$$

wherein, $\theta_i$ represents a reference value of a phase shift angle of a carrier for an $i^{th}$ three-phase bridge arm, m represents a total number of converters of currently running wind turbines on the same collecting line in the wind farm, n represents a number of three-phase bridge arms in each converter on the collecting line, i represents a serial number of a currently running three-phase bridge arm, $k_j$, represents a reference value of a carrier ratio of a carrier for a $j^{th}$ converter, and j represents a serial number of a currently running converter.

5. The method according to claim 1, wherein the characteristic quantity of the modulated wave comprises a phase angle and an amplitude of the modulated wave, and the step of generating the unified regulation instruction comprises:
  calculating a grid phase angle at the point of common coupling based on the real-time voltage and current signals;
  determining a reference value of the phase angle of the modulated wave based on the calculated grid phase angle; and
  determining a reference value of the amplitude of the modulated wave based on an amplitude command value of the modulated wave.

6. The method according to claim 1, wherein the step of generating the unified regulation instruction comprises:
  calculating a harmonic content of a specific order at the point of common coupling based on the real-time voltage and current signals;
  comparing the calculated harmonic content of the specific order with a command value of harmonic content of the specific order;
  calculating, in response to a difference between the calculated harmonic content of the specific order and the command value of the harmonic content of the specific order exceeding a predetermined threshold, a reference value of a reverse current injection amount of harmonic of the specific order, based on the difference between the calculated harmonic content of the specific order and the command value of the harmonic content of the specific order; and
  inserting the calculated reference value of the reverse current injection amount of the harmonic of the specific order into the unified regulation instruction.

7. The method according to claim 1, further comprising:
  transmitting the regulation instructions for the converters of all the currently running wind turbines to converter controllers of the converters respectively; and
  regulating each of the three-phase bridge arms in a respective converter by each of the converter controllers based on a received regulation instruction.

8. The method according to claim 7, wherein the step of transmitting the regulation instructions comprises:
  transmitting the regulation instructions through a high-speed optical fiber communication network.

9. The method according to claim 7, wherein the step of regulating based on the regulation instruction comprises:
  performing the following operations for each of the three-phase bridge arms of the converters of each currently running wind turbine:
    determining a carrier and a modulated wave for modulation of an IGBT on each of the three-phase bridge arms, based on the reference value of the phase shift angle of the carrier, the reference value of the carrier ratio and the reference value of the characteristic quantity of the modulated wave;
    generating a trigger pulse sequence for the IGBT on each of the three-phase bridge arms, based on the carrier and the modulated wave as determined for modulation of the IGBT on each of the three-phase bridge arms; and
    modulating the IGBT on each of the three-phase bridge arms based on the generated trigger pulse sequence for the IGBT on each of the three-phase bridge arms.

10. The method according to claim 7, wherein the step of regulating based on the regulation instruction comprises:
  injecting, by some of the converters in response to the unified regulation instruction comprising the reference value of the reverse current injection amount of the harmonic of the specific order, a reverse harmonic current into the collecting line based on the reference value of the reverse current injection amount of the harmonic of the specific order.

11. The method according to claim 10, wherein the some of the converters are converters in currently running wind turbines of which the real-time power reaches a predetermined threshold.

12. An apparatus for regulating converters of wind turbines in a wind farm, the apparatus comprising:
  a processor; and
  a memory, which stores a computer program thereon, wherein the computer program, when being executed by the processor, implements the method for regulating converters of wind turbines in a wind farm according to claim 1.

13. The apparatus according to claim 12, wherein the apparatus is integrated in a converter controller that is located closest to the point of common coupling.

14. A computer-readable storage medium with instructions stored thereon, wherein the instructions, when being executed by at least one processor, cause the at least one processor to implement the method for regulating converters of wind turbines in a wind farm according to claim 1.

15. The method according to claim 2, further comprising:
  transmitting the regulation instructions for the converters of all the currently running wind turbines to converter controllers of the converters respectively; and
  regulating each of the three-phase bridge arms in a respective converter by each of the converter controllers based on a received regulation instruction.

16. The method according to claim 3, further comprising:
  transmitting the regulation instructions for the converters of all the currently running wind turbines to converter controllers of the converters respectively; and
  regulating each of the three-phase bridge arms in a respective converter by each of the converter controllers based on a received regulation instruction.

17. The method according to claim 4, further comprising:
  transmitting the regulation instructions for the converters of all the currently running wind turbines to converter controllers of the converters respectively; and
  regulating each of the three-phase bridge arms in a respective converter by each of the converter controllers based on a received regulation instruction.

18. The method according to claim 5, further comprising:
  transmitting the regulation instructions for the converters of all the currently running wind turbines to converter controllers of the converters respectively; and
  regulating each of the three-phase bridge arms in a respective converter by each of the converter controllers based on a received regulation instruction.

19. The method according to claim 6, further comprising:
  transmitting the regulation instructions for the converters of all the currently running wind turbines to converter controllers of the converters respectively; and
  regulating each of the three-phase bridge arms in a respective converter by each of the converter controllers based on a received regulation instruction.

* * * * *